United States Patent [19]

Kakubari et al.

[11] Patent Number: 4,635,612
[45] Date of Patent: Jan. 13, 1987

[54] BARBECUE BURNER DEVICE

[75] Inventors: Shoichiro Kakubari, Maebashi; Hidetomo Okamura, Kumagaya, both of Japan

[73] Assignee: Yamani Netsu Kogyo, Gunma, Japan

[21] Appl. No.: 702,260

[22] Filed: Feb. 15, 1985

[30] Foreign Application Priority Data

Sep. 10, 1984 [JP] Japan .................. 59-189000

[51] Int. Cl.⁴ ............................................. A47J 37/07
[52] U.S. Cl. .................. 126/25 R; 126/9 B; 126/25 C
[58] Field of Search ............ 126/9 R, 9 B, 25 R, 126/25 C, 41 R

[56] References Cited

U.S. PATENT DOCUMENTS

| | | | |
|---|---|---|---|
| 2,221,098 | 11/1940 | Langsam | 126/9 B X |
| 2,727,505 | 12/1955 | Hood | 126/25 R |
| 2,903,549 | 9/1959 | Joseph | 126/41 R X |
| 2,910,930 | 11/1959 | Hankoff | 126/9 B X |
| 3,306,280 | 2/1967 | Vannoy | 126/25 R |
| 3,491,744 | 1/1970 | Von Kohorn et al. | 126/25 R |
| 3,606,066 | 9/1971 | Anderson | 126/25 C X |
| 3,667,446 | 6/1972 | Morton | 126/9 R |
| 4,418,678 | 12/1983 | Erickson | 126/9 R |

Primary Examiner—Margaret A. Focarino
Attorney, Agent, or Firm—Robert F. Ziems

[57] ABSTRACT

A barbecue burner device is substantially composed of an inner vessel formed with a bottom wall and enclosed side walls standing up from the bottom wall and opened at the top thereof for accommodating therein pieces of charcoal, said side walls providing a stepped face on the inside thereof, said inner vessel further having a ventilation hole formed in one of said side walls; food carrier means adapted to be placed on said stepped face of the inner vessel; an external vessel for receiving therein said inner vessel, said external vessel being formed with enclosed side walls opened at least at the top thereof and having a ventilation hole which is in alignment with the ventilation hole of said inner vessel when the latter is received in said external vessel, said external vessel having support means provided therein for supporting said inner vessel and positioning means provided therein for positioning said inner vessel with respect to said external vessel; heat-insulation means provided on the inner face of said external vessel; and ventilation adjusting means arranged on said external vessel, said ventilation adjusting means being manually operated with respect to said ventilation hole of said external vessel to adjust the ventilation of the barbecue burner device, wherein said inner vessel and said external vessel are designed to provide a heat-insulation space therebetween all around said side walls thereof when said inner vessel is received in said external vessel.

14 Claims, 6 Drawing Figures

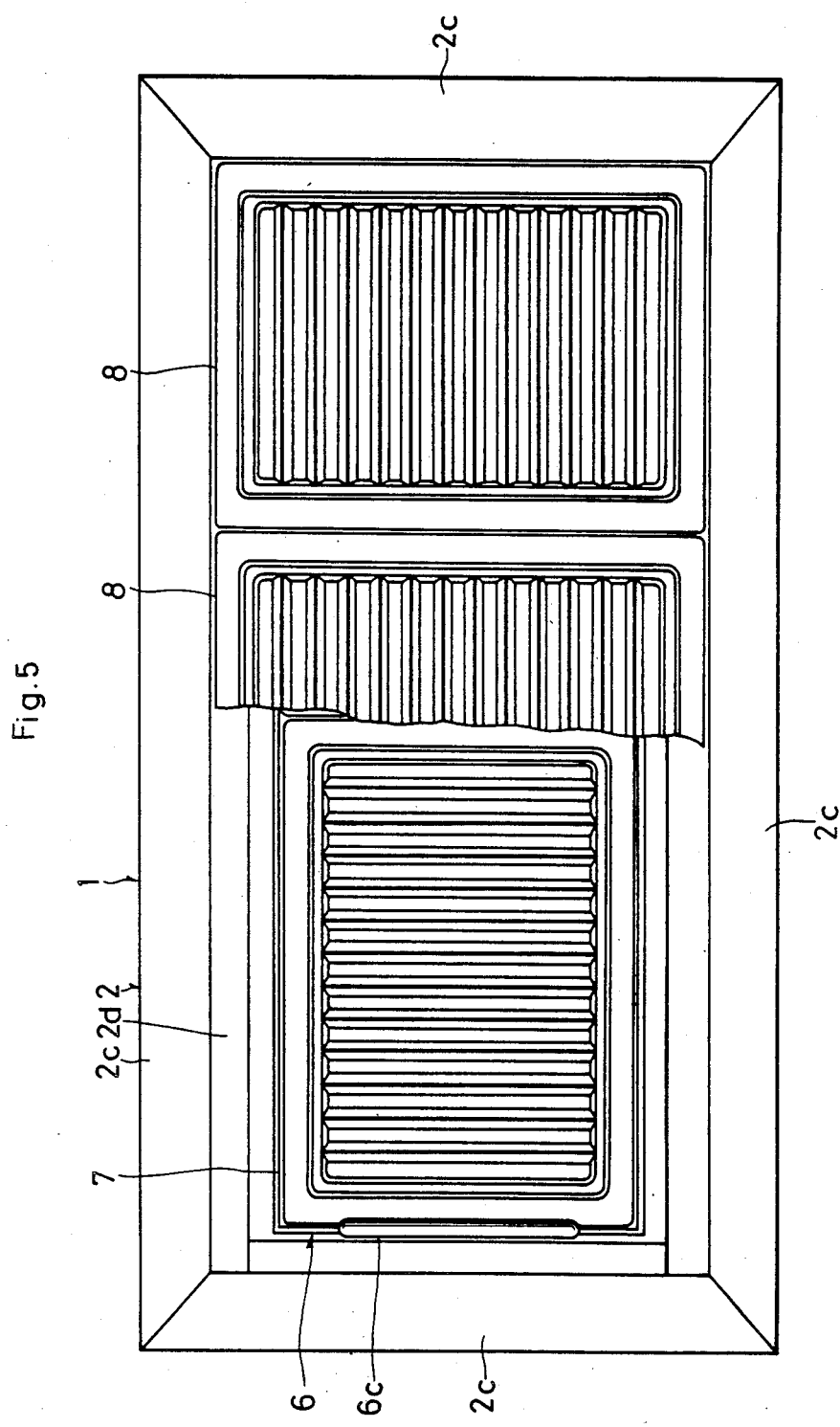

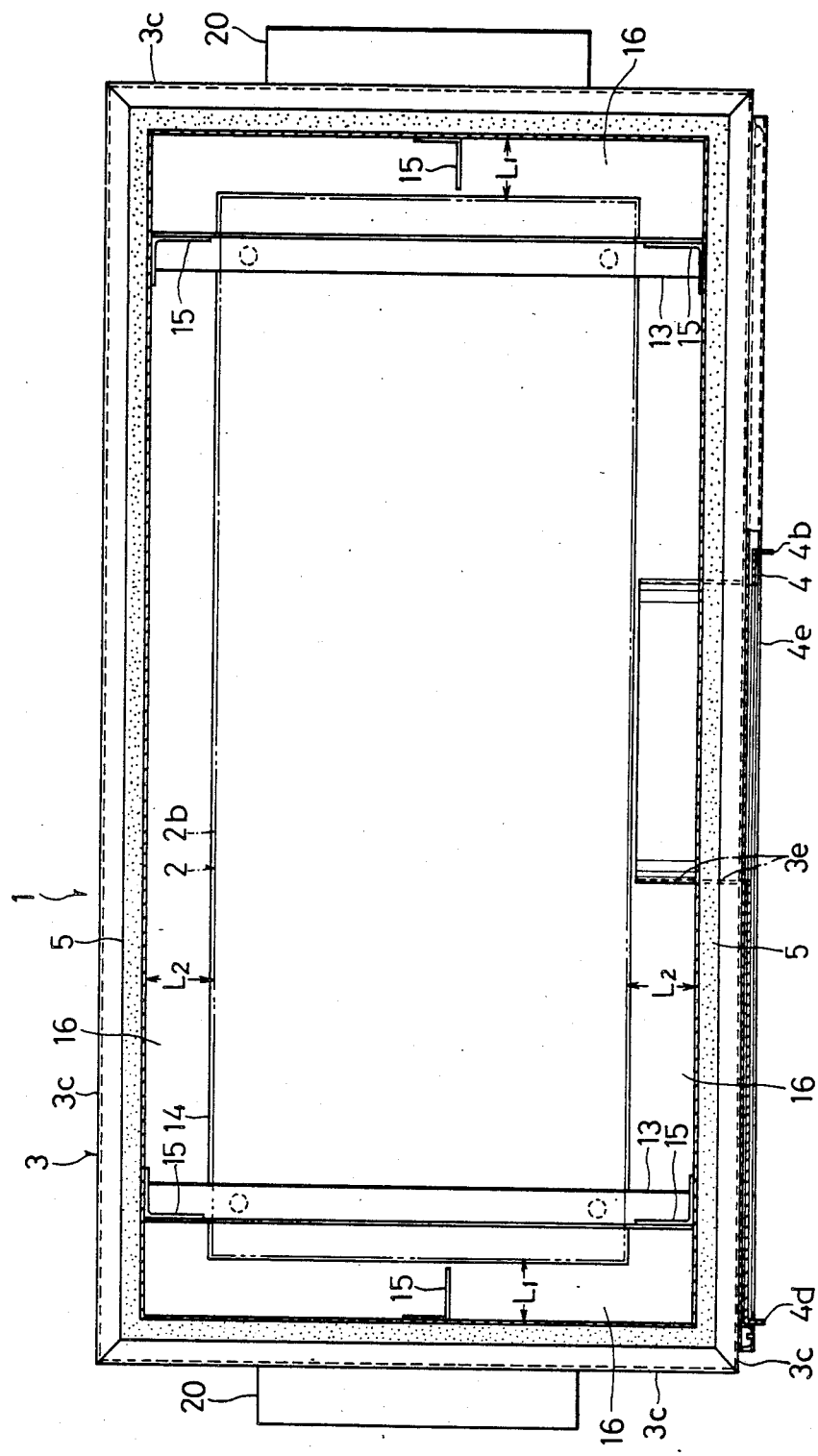

BARBECUE BURNER DEVICE

The invention relates to a barbecue burner device, and more particularly relates to a charcoal burner for barbecue which is substantially composed of a box shaped inner vessel and external vessel with a heat insulation space being provided therebetween. The heat insulation space is sufficient enough to maintain a moderate temperature at the outer face of the external vessel when an ample amount of charcoal is burnt in the inner vessel, so that the people concerned may be safe if they happen to touch the external vessel while they are enjoying the barbecue and so that they may enjoy the delicious taste of meat roasted by the heat of charcoal with a relaxed feeling in the absence of direct heat of the barbecue device itself.

BACKGROUND OF THE INVENTION

It is generally known that many high-class hotels and restaurants have been preparing the barbecued meat dishes for the customers. In this case, a cook is in charge of a barbecue burner device for business use to serve the barbecued meat to a group of customers who take seats around the barbecue burner device. Now as the fuel of the barbecue burner device, the city supplying gas or the propane gas is generally used. In this connection, one thing is that recently people have come to be particular about the taste of food and not to be satisfied with the taste of meat barbecued by the heat of gas. Another thing is that the city supplying gas or the propane gas has always a risk of explosion and is something to be reluctant to be used at a place where there are many people getting together.

It is therefore recommended that charcoal is best to heighten the taste of the barbecued meat and at the same time has no risk of explosion. It is however to be admitted that the heat capacity to be required in a predetermined time must be obtained only by a set amount of charcoal which may be placed in the barbecue burner while the city supplying gas or the propane gas may be used progressively increasing or decreasing the heat capacity. The burned charcoal will therefore extremely heat the barbecue burner device itself when compared with the gas. In fact if the charcoal is burned in the conventional barbecue burner device of a gas type, the burner device will be easily heated up to the extent that the customers who happen to touch the external part of the barbecue device will be instantly get burnt. This is because the charcoal used barbecue burner device has not practically realized in the hotels and restaurants.

BRIEF SUMMARY OF THE INVENTION

The invention has been provided to eliminate the defects and disadvantages of the prior art. It is therefore a principal object of the invention to provide a charcoal fuel type barbecue burner device having a quality of high safety which is substantially composed of an inner vessel for accommodating the pieces of charcoal and an external vessel with a heat insulation space being provided between the outer face of the inner vessel and the inner face of the external vessel, such that the heat of burnt charcoal will be prevented from being substantially transmitted from the inner vessel to the external vessel which may be touched by the customers. It is another object of the invention to prepare a delicious taste of meat barbecued by the heat of charcoal to the customers in the hotels and restaurants securing the safety of customers from the danger of the gas explosion. It is still another object of the invention to provide a high heat-insulation ceramic wool all over the inner face of the external vessel of the barbecue burner device and to provide a cover having the same heat-insulation material attached to the inner side thereof, which may fittingly close the charcoal accommodating inner vessel and further to provide an adjustable ventilation at the external vessel so as to be able to freely adjust the heat of the burning charcoal, all for the purpose of well preserving the burning charcoal of closing the inner vessel after a group of customers have left the place and until another group of customers come round, to thereby avoid the useless consumption of the charcoal and the troublesome re-burning work of charcoal, that is, to attain the energy-saving as well as the labor-saving.

In short, the invention substantially comprises an inner vessel formed with a bottom wall and opened side walls standing up from the bottom wall and opened at the top thereof for accommodating therein pieces of charcoal, said side walls providing a stepped face on the inner side thereof for supporting thereon one or more food carrier elements, said inner vessel having a ventilation hole formed in one of said side walls; an external vessel for receiving therein the inner vessel, said external vessel being formed with enclosed side walls opened at the top and the bottom thereof and having a ventilation hole formed one of said side walls, said ventilation hole being adapted to be in alignment with the ventilation hole of said inner vessel, said external vessel having a heat-insulation material attached to the inner face of said enclosed side walls, and further having a predetermined number of frames provided therein for supporting said inner vessel and a predetermined number of elements provided therein for accurately positioning said inner vessel with respect to the external vessel; and ventilation adjusting means arranged on said external vessel and manually operated with respect to said ventilation hole of the external vessel to adjust the ventilation of the barbecue burner device, said inner and external vessels being designed to provide a heat-insulation space therebetween all round the side walls when the inner vessel is received within the external vessel.

BRIEF DESCRIPTION OF THE DRAWINGS

FIG. 5 is a plan view of the barbecue burner device taken from the arrows V—V in FIG. 3; and FIG. 6 is a plan view of the barbecue burner device taken from the arrows VI—VI in FIG. 3.

DETAILED DESCRIPTION OF THE INVENTION

Figure 1:
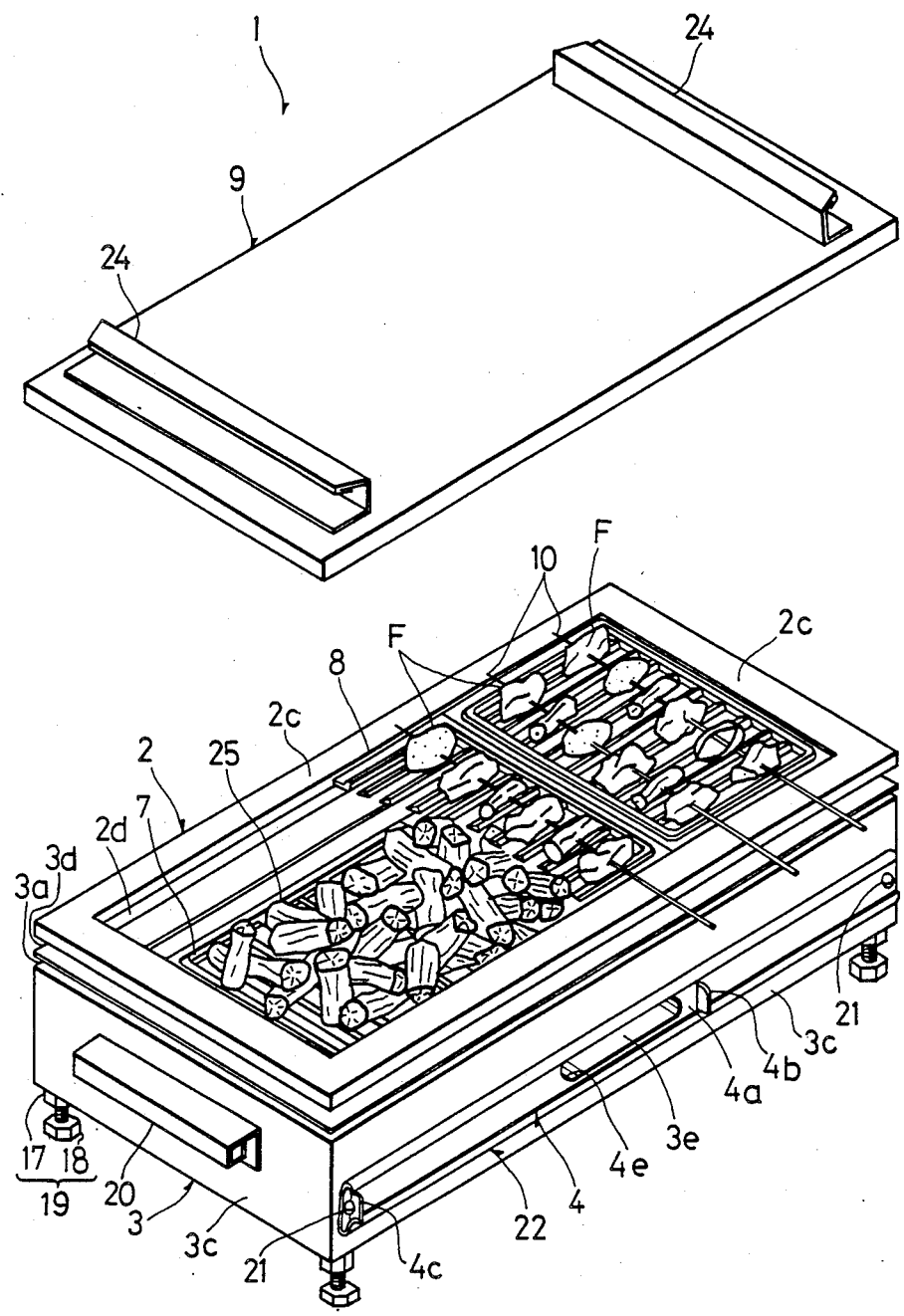
FIG. 1 is a perspective view of a barbecue burner device of the invention shown as actually used for the barbecue.

The invention will be described in reference to a preferred embodiment as shown in the drawings. Particularly in reference to FIGS. 1 to 3 and 5, the barbecue burner device of the invention substantially comprises an inner vessel 2 for accommodating therein pieces of charcoal 25, an external vessel 3, an adjustable ventilator 4, a heat-insulation material 5, a charcoal carrier framework 6, a plurality of food carriers 8 and a cover 9.

The charcoal accommodating inner vessel 2 is preferably made of a shining thin stainless steel and has a rectangular shape opened at the top. More particularly, the inner vessel is composed of a bottom wall 2a, side walls 2b standing up from the bottom 2a and extending laterally and longitudinally of the vessel 2 and connected to each other at the corners thereof, a flange 2c extended outwardly and horizontally from the top of the side walls 2b all therealong and a step 2d provided inside of the vessel 2 between the upper end of the side walls 2b and the flange 2c to support thereon the food carriers 8. A ventilation hole 2e is formed in one of the longitudinal walls 2b as particularly shown in FIG. 2. The flange 2c may be used to support both end parts of the skewers 10 pierced through pieces of food F.

The external vessel 3 is preferably made of a shining thin stainless steel having a rectangular shape opened at the top 3a and the bottom 3b thereof. The vessel 3 is defined by lateral and longitudinal side walls 3c which are connected to each other at the corners thereof and have a heat-insulation material 5 such as a ceramic wool (named Caowool Board 1600 produced by The Isolite Industry) of approximately 20 mm thick provided all over on the inner face of thereof. The external vessel 3 has a pair of frames 13 spaced from each other and extended between the opposite longitudinal walls 3c at the bottom 3b thereof. The frames 13 are provided to support thereon the inner vessel 2 within the external vessel 3, and have a heat-insulation material 14 such as a slate plate secured to the underside thereof. The side walls 3c have a predetermined number of angled plates 15, for example six angled plates, secured to the inner face thereof with predetermined spaces provided therebetween. These angled plates 15 are provided to position the inner vessel 2 within the external vessel 3, preventing the former from being displaced in the horizontal direction with respect to the latter. The angled plates 15 may be made of a stainless steel of approximately 0.8 mm thick.

Figure 3:
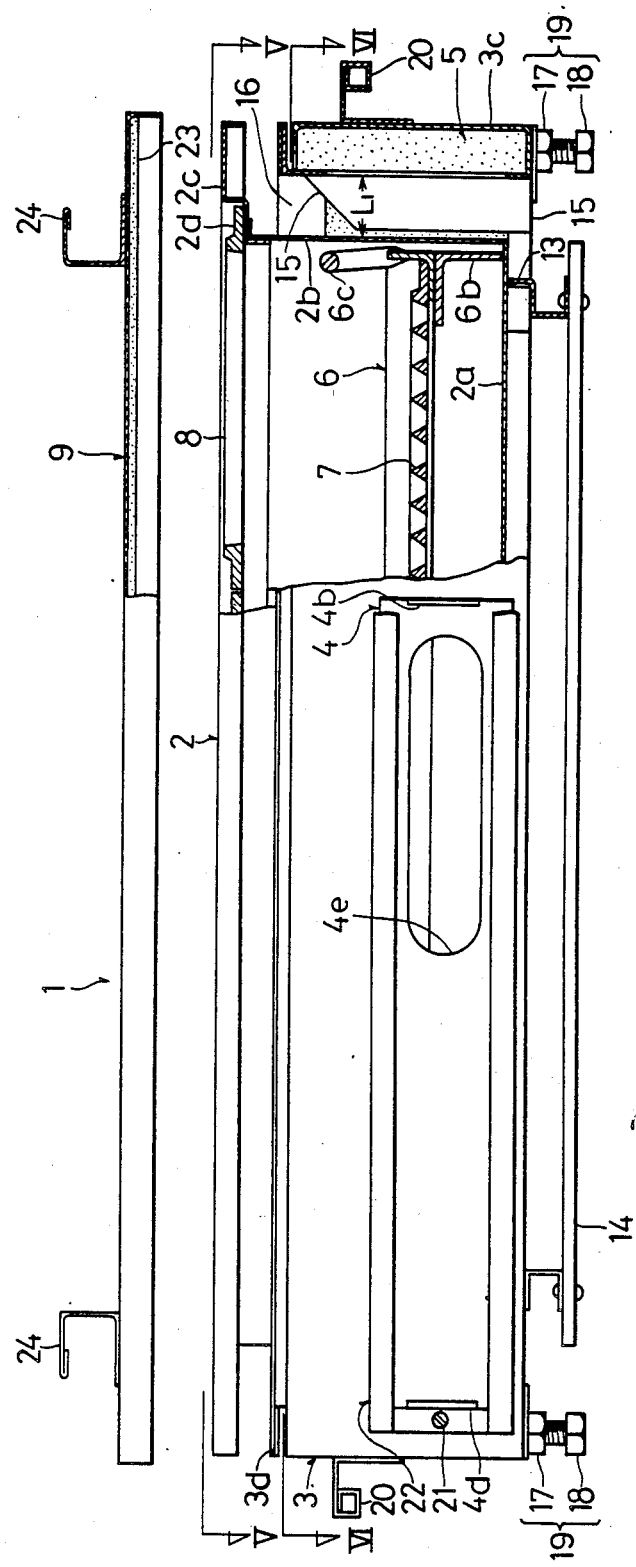
FIG. 3 is a front elevational view of the barbecue burner device shown partly in section.
Figure 4:
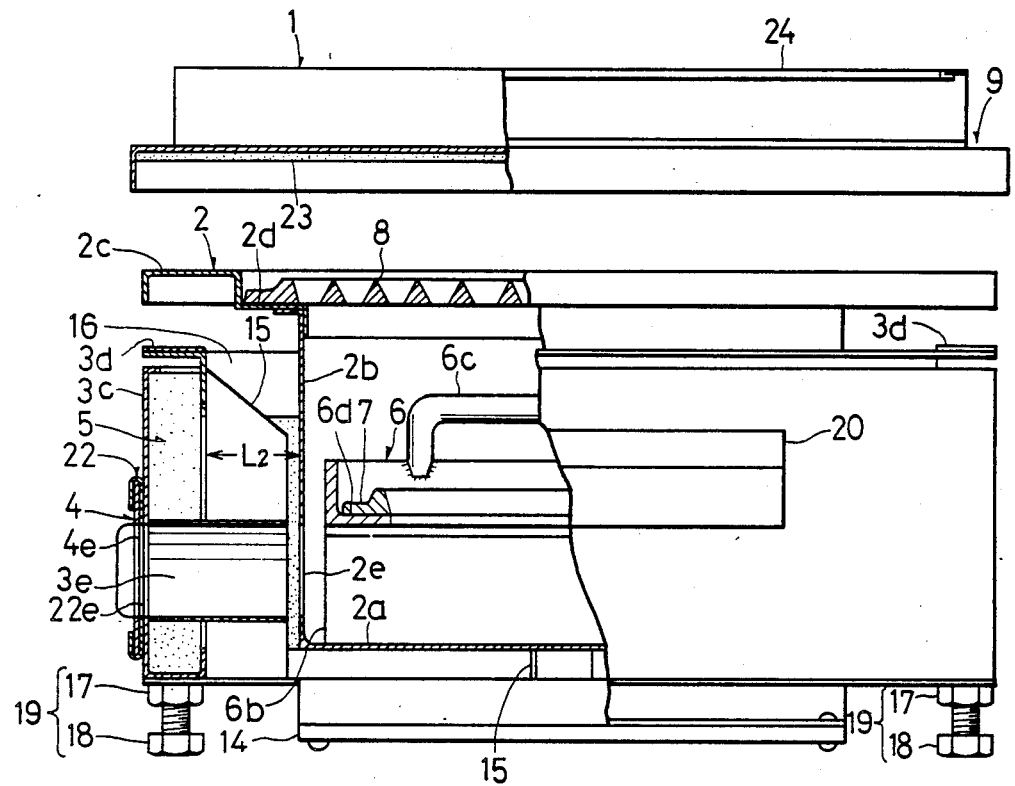
FIG. 4 is a side elevational view of the barbecue burner device shown partly in section.

One of the opposite longitudinal side walls 3c has a ventilation hole 3e which is of the same shape and same size with the ventilation hole 2e of the inner vessel 2 and located in alignment with the ventilation hole 2e of the longitudinal wall 2e of the inner vessel 2. The inner vessel 2 and the external vessel 3 are so dimensioned that heat-insulation spaces 16 of predetermined distances $L_1$, $L_2$ may exist between the outer face of the side walls 2b of the inner vessel 2 and the inner face of the side walls 3c of the external vessel 3 all therearound when the inner vessel 2 is inserted into the external vessel 3 and is positioned with respect to the latter by the frames 13 and the angled plates 15 as shown in FIG. 6. The side walls 3c are terminated in a flange 3e at the top 3a thereof extending outwardly in the horizontal plane. The external vessel 3 has feet 19 provided at the four corners of the bottom thereof as shown in FIGS. 3 and 4. Each of the feet 19 is composed of a nut 17 and a bolt 18 which is in threaded engagement with the nut 17 such that the height of the barbecue burner device 1 may be variably adjusted. A pair of grips 20 are secured to the opposite lateral walls 3c respectively such that the barbecue burner device 1 may be portable by hand.

A ventilation adjusting plate 4 is slidably mounted on a guide rail 22 which is C-shaped in section and secured to the aforementioned one of the opposite longitudinal walls 3c of the external vessel 3 by means of a pair of fastening screws 21. The ventilation plate 4 is formed with a ventilation hole 4e which is of the same shape and same size with the ventilation holes 2e, 3e. The ventilation plate 4 is at both ends 4a, 4c outwardly bent to provide holds 4b, 4d respectively so as to be accessible for slidably moving the plate 4 in reference to the ventilation holes 2e, 3e of the inner and external vessels 2, 3.

Figure 2:
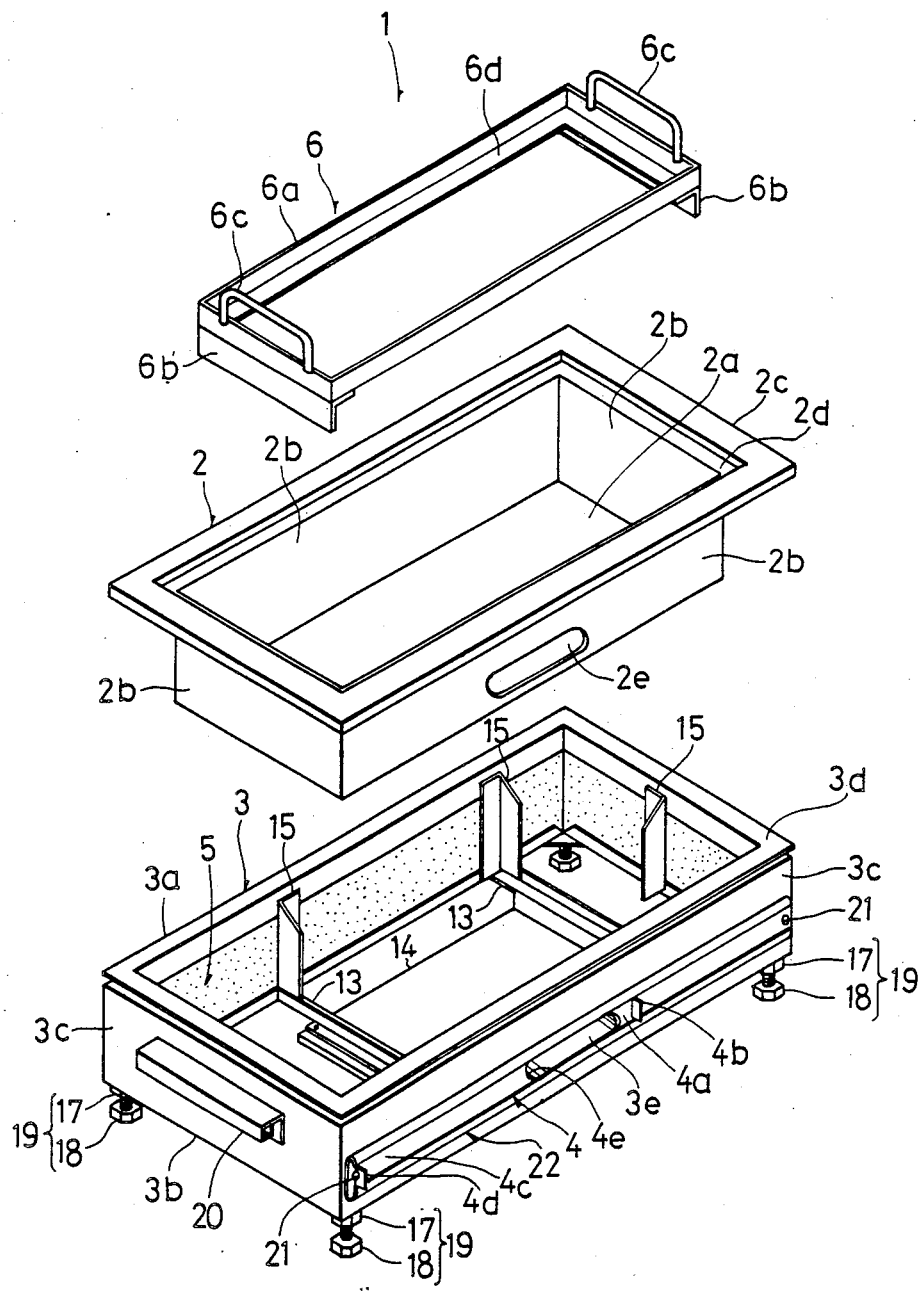
FIG. 2 is an exploded perspective view of the barbecue burner device.

The charcoal carrier framework 6 is rectangular as shown in FIG. 2 corresponding to the inner vessel 2. The main body 6a may be made of thick steel plates welded to each other. A pair of grips 6c are provided on the opposite lateral plates and a step 6d is formed at the bottom all around the frame plates as shown for support thereon a plurality of charcoal carriers 7. Further a pair of feet 6b are secured to the underside of the main body 6a at the longitudinally opposite ends thereof. The charcoal carriers are grated and made of a cast iron as shown in FIGS. 3 to 5. In this embodiment a set of two charcoal carriers are used.

The food carriers 8 are also grated and made of a cast iron and a set of three food carriers are used in this embodiment.

The cover 9 is preferably made of a shining thin stainless steel and has a heat-insulation material 23 attached to the underside thereof. The cover 9 has a pair of grips 24 secured to the longitudinally opposite end portions thereof. The cover 9 may be used to fittingly close the charcoal accommodating inner vessel 2 while the ventilation adjusting plate 4 is moved to close up the ventilation holes 2e, 3e, such that the burning pieces of charcoal 25 may be kept inert until the barbecue burner device 1 is used for the next new group of customers.

With the barbecue burner device 1 of the invention being structured as mentioned above, the operation is as follows: For putting the barbecue burner device 1 into practical use, the feet 19 are first of all adjusted to determine the hight and horizontal balance of the device 1 by turning the bolts 18 at the four corners of the external vessel 3. The charcoal accommodating inner vessel 2 is then put into the external vessel 3 and placed on the pair of frames 13 in reference to the angled plates 15. Thus the inner vessel 2 is correctly positioned with respect to the external vessel 3 with a space 16 being provided between the outside of the inner vessel 2 and the inner side of the external vessel 3, which space 16 being laterally defined by the distance $L_1$ and longitudinally defined by the distance $L_2$ for effectively insulating the heat of burning charcoal. At the same time, the ventilation holes 2e, 3e, 4e respectively of the inner vessel 2, the external vessel 3e and the ventilation adjusting plate 4 are completely aligned with each other, and therefore the ventilation may be freely adjusted by slidingly moving the ventilation adjusting plate 4 along the guide rail 22.

For actually barbecuing the pieces of meat and other food, the pieces of burnt charcoal 25 are properly placed on the charcoal carriers 7, and then the food carriers 8 are placed on the step 2d of the inner vessel 2, and then the pieces of food F such as various kinds of meat and vegetable pierced through by the skews 10 are arranged on the food carriers 8. The charcoal burns up and heats the food carriers 8 and pieces of food F thoroughly, and the barbecue dishes are made up, which are something specially delicious heated through by the heat of charcoal. Then the customers may take any of the food piercing skewers 10 as they like. In this case, the customers may easily happen to touch the flange 2c of the charcoal accommodating inner vessel 2 as well as the outer side walls 3c of the external vessel 3. In this respect, the barbecue burner device 1 is designed to protect the hands of the customers from being burnt by the heat.

The heat of burning charcoal 25 is transmitted to the inner vessel 2 by radiation and heat-conduction. However the inner vessel 2 is made of a shining stainless steel, and therefore a considerable amount of heat is reflected by the inner face of the side walls 2b to the extent that the flange 2c of the inner vessel 2 will not be heated up to the danger of being burnt. As the result of test, it has been confirmed that the flange 2c will once reach the highest temperature 58° C. in 45 minutes after the barbecue burner device 1 is used, but will come down to the temperature 46° C. as the time is past further. It is needless to say that such temperatures are more than safe to the human body.

It must be necessary to further consider the heat that may be transmitted to the external vessel 3 from the internal vessel 2 in which the pieces of charcoal 25 are burning. As stated above, the barbecue burner device 1 has a considerably broad space 16 for heat-insulation provided between the side walls 2b of the inner vessel 2 and the side walls 3c of the external vessel 3 as specifically defined by the distances $L_1$, $L_2$. This space 16 has been designed to be effective to considerably lessen the heat of burning charcoal 25 from the side walls 2b of the inner vessel 2 to the side walls 3c of the external vessel 3. Moreover the external vessel 3 has the ceramic wool of 22 mm thick as the heat-insulation material 5 attached to the inner face of the side walls 3c thereof. This ceramic wool, together with the space 16, will prevent the external vessel 3 from being heated up to the dangerous extent. As the result of test, it has been confirmed that the front side of the sidewalls, which is opposite to the wall having the ventilation hole 3e formed therein, will reach the temperature 40° C. in 15 minutes after the barbecue burner device 1 is used, reach the temperature 50° C. in 30 minutes, reach the temperature 58° C. in 45 minutes, and come down to the temperature 46° C. in 60 minutes, maintain the temperature 46° C. in 75 minutes and come down to the temperature 44° C. in 90 minutes. It has been also confirmed that the opposite lateral side walls of the external vessel 3 will reach the temperature 35° C. in 15 minutes after the barbecue burner device 1 is used, reach the temperature 42° C. in 30 minutes, reach 43° C. in 45 minutes, and come down to 42° C. in 75 minutes and come down to 35° C. in 90 minutes. Thus it is needless to say that such temperatures are more than safe to the human body.

As to the table (not shown) on which the barbecue burner device 1 is placed, the heat-insulation material 14 at the bottom of the external vessel 3 will prevent the heat from being directly transmitted to the table from the bottom 2a of the inner vessel 2. As the result of test, it has been confirmed that the upper face of the table will reach the temperature 41° C. in 15 minutes after the device 1 is used, reach the temperature 52° C. in 60 minutes and come down to the temperature 43° C. in 90 minutes. Thus it has been found that a wooden table would be sufficient enough to support the barbecue burner device 1 of this invention.

The heating power of charcoal 25 may be easily adjusted by slidingly moving the ventilation adjusting plate 4 along the guide rail 22 in reference to the ventilation holes 2e, 3e by means of any of the holes 2b, 2d.

Further according to the invention, the burning charcoal 25 may be kept inert after the first barbecue party has been finished. Generally in the hotels and restaurants, the customers who enjoy the barbecue dishes will require one and a half hour at shortest and two hours at longest. However in such a period of time, the predetermined amount of charcoal 25 will not burn out and remains as it is burning. The burning charcoal 25 is therefore kept inert until the next group of customers come around, by closing up the ventilation hole 3e with manipulation of the ventilation adjusting plate 4 and by closing the charcoal accommodating inner vessel 2 with the cover 9. Since the inert charcoal 25 will burn up again if the ventilation hole 3e is opened and the cover 9 is removed, the next barbecue dishes will be smoothly prepared only by adding new pieces of charcoal into the inner vessel 2. Thus the barbecue burner device 1 of the invention is designed to exclude the labor for newly burn up the pieces of charcoal 25 each time the customers change, thus contributing to the labor-saving.

The ashes or cinders of charcoal 25, the grease and carbonated pieces of meat and other food will be spontaneously dropped to the bottom 2a of the inner vessel 2 through the grated charcoal carrier 7 while the skewered pieces of meat and vegetables are barbecued. The barbecue burner device 1 will therefore be very easily cleaned up and will never blot or stain the table on which the device 1 is placed, and accordingly will be used in home as well as in hotels and restaurants for business purpose.

With the invention having been thus described, it will be obvious that the same may be varied in many ways. Such variations or modifications will not be regarded as a departure from the spirit and scope of this invention, and all such modifications will be included within the scope of the following claims.

What is claimed is:

1. A barbecue burner device comprising an inner vessel with a bottom wall and enclosed side walls standing up from the bottom wall and opened at the top thereof for accommodating therein pieces of charcoal, said side walls providing a stepped face on the inside thereof, said inner vessel further having a ventilation hole formed in at least one of said side walls;

an external vessel for receiving therein said inner vessel, said external vessel being formed with enclosed side walls defined by inner and outer faces providing a top and a lower end and being opened at least at the top thereof and having a ventilation hole formed in at least one of said side walls, said ventilation hole being adapted to be in alignment with said ventilation hole of said inner vessel;

support means located in said external vessel between opposite side walls near the lower end thereof to support said inner vessel spaced from the lower end of said external vessel;

positioning means secured to the inner faces of the side walls of said external vessel to position said inner vessel in spaced relation with respect to the side walls of said external vessel;

heat-insulation means provided on the inner face of said side walls of said external vessel;

food carrier means adapted to be placed on said stepped face of said inner vessel; and ventilation adjusting means arranged on said external vessel, said ventilation adjusting means being manually operated with respect to said ventilation hole of said external vessel to adjust the ventilation of the barbecue burner device, wherein said inner vessel and said external vessel are positioned to provide a heat-insulation space therebetween all around the side walls thereof when said inner vessel is received in said external vessel.

2. A barbecue burner device comprising an inner vessel formed with a bottom wall and enclosed side walls standing up from the bottom wall and opened at the top thereof for accommodating therein pieces of charcoal, said side walls providing a stepped face on the inner side thereof, said inner vessel further having a ventilation hole formed in one of said side walls;

an external vessel for receiving therein said inner vessel, said external vessel being formed with enclosed side walls defined by inner and outer faces providing a top and a lower end and being opened at the top thereof, at least one of said side walls having a ventilation hole which is to be aligned with said ventilation hole of said inner vessel;

support means located in said external vessel between opposite side walls near the lower end thereof to support said inner vessel spaced from the lower end of said external vessel;

positioning means secured to the inner faces of the side walls of said external vessel to position said inner vessel in spaced relation with respect to the side walls of said external vessel;

heat-insulation means provided on the inner face of said external vessel;

food carrier means adapted to be placed on said stepped face of said inner vessel;

ventilation adjusting means arranged on said external vessel and manually operated with respect to said ventilation hole of said external vessel; and cover means for closing up said opened top of said inner vessel, said cover means cooperating with said ventilation adjusting means to maintain the burning pieces of charcoal to be inserted in said inner vessel.

3. The barbecue burner device as defined in one of claims 1 and 2 further comprising means including a framework to be placed in said inner vessel and charcoal carrier means including a plurality of grated metal plates for carrying thereon said pieces of charcoal and being placed on said framework.

4. The barbecue burner device as defined in one of claims 1 and 2, wherein said food carrier means includes a plurality of grated metal plates for substantially carrying thereon skewered pieces of food to be barbecued.

5. The barbecue barner device as defined in one of claims 1 and 2, wherein said inner and external vessels are made of a stainless steel.

6. The barbecue burner device as defined in claim 5, wherein said inner vessel has a flange extended outwardly and laterally from said side walls at the top thereof.

7. The barbecue burner device as defined in claim 5, wherein said external vessel has a flange extended outwardly and laterally from said side walls at the top thereof.

8. The barbecue burner device as defined in one of claims 1 and 2, wherein said heat-insulation means includes a ceramic wool attached substantially all over the inner face of said walls of the external vessel.

9. The barbecue burner device as defined in one of claims 1 and 2, wherein said ventilation adjusting means includes a plate mounted on said one of said side walls of the external vessel and slidingly movable in reference to said ventilation hole of said external vessel to adjust the ventilation of the barbecue burner device.

10. The barbecue burner device as defined in claim 9 further comprising a heat-insulation plate provided at the lower end of said external vessel.

11. The barbecue burner device as defined in claim 10 further comprising a predetermined number of feet provided at the lower end of said side walls of the external vessel and including means to adjust the height of the barbecue burner device.

12. The barbecue burner device as defined in claim 11 further comprising at least a pair of grips provided on the side walls of the external vessel for being accessible to carry the barbecue burner device.

13. The barbecue burner device as defined in one of claims 1 and 2, wherein said support means includes a plurality of frames arranged in said external vessel with a predetermined space provided therebetween to support thereon said inner vessel.

14. The barbecue burner device as defined in one of claims 1 and 2, wherein said positioning means includes a plurality of angled plates arranged in said external vessel, said angled plates cooperating with said frames to position said inner vessel with respect to said external vessel.

* * * * *